United States Patent [19]

Stirling

[11] Patent Number: 5,680,146
[45] Date of Patent: Oct. 21, 1997

[54] LOCAL COMMUNICATION SYSTEM AND STATION FOR USE IN SUCH A SYSTEM

[75] Inventor: Andrew J. Stirling, Epsom Downs, England

[73] Assignee: D2B Systems Company Limited, New York, N.Y.

[21] Appl. No.: 353,039

[22] Filed: Dec. 9, 1994

[30] Foreign Application Priority Data

Dec. 10, 1993 [GB] United Kingdom ............ 9325301

[51] Int. Cl.$^6$ .................................................. G09G 3/02
[52] U.S. Cl. ............................................... 345/1; 345/2
[58] Field of Search ........................................ 345/1, 2

[56] References Cited

U.S. PATENT DOCUMENTS

| | | | |
|---|---|---|---|
| 3,555,520 | 1/1971 | Helbig et al. | 345/1 |
| 3,891,792 | 6/1975 | Kimura | 178/5.8 R |
| 3,941,926 | 3/1976 | Slobodzian et al. | 178/73 |
| 3,961,365 | 6/1976 | Payne et al. | 358/56 |
| 4,051,522 | 9/1977 | Healy et al. | 358/86 |
| 5,258,952 | 11/1993 | Coker et al. | 365/194 |

FOREIGN PATENT DOCUMENTS

| | | | |
|---|---|---|---|
| 0535749 | 10/1991 | United Kingdom | H02J 13/00 |
| 0505006 | 3/1992 | United Kingdom | H04B 1/20 |

*Primary Examiner*—Mark R. Powell
*Assistant Examiner*—Vincent E. Kovalick
*Attorney, Agent, or Firm*—Anne E. Barschall

[57] ABSTRACT

A local communication system has a number of stations (10,12,13,14) connected for the communication of messages by one or more data channels (16). One of the stations (14) comprises a display device operable to display messages sent by other stations (10,12) in separate ones of a plurality of fields. A station (10,12) sending a display command and message to the user output subdevice (41) of the display device includes field separators identifying discrete parts of the message to be displayed in successive fields of the display and the message portions may be sent as separate messages.

20 Claims, 4 Drawing Sheets

LOCAL COMMUNICATION SYSTEM AND STATION FOR USE IN SUCH A SYSTEM

The invention relates to a local communications system, and to a device for use in such a system. In particular the present invention relates to a local communications system comprising a plurality of devices interconnected for the communication of messages via one or more data channels, each device including at least one functional subdevice element, the subdevices in the system including a user output subdevice for displaying user-readable messages to a user of the system, a user-readable message being determined by status information of a device, composed into a user-readable message by the subdevice element of that device, and transmitted directly or indirectly to the user output subdevice for display.

Examples of local communication system of the type set forth in the opening paragraph are described in our European patent applications EP-A-0505006(PHQ91010) and EP-A-0535749(PHQ91036).

A problem with existing systems occurs when it is desired to send lengthy messages for display: to ensure transmission of the complete message, it is generally necessary to lock the data channel between the originating subdevice and user output subdevice bus, in the absence of alternating data paths, such locking can act to effectively prevent the transmission of non-display messages between others of the subdevices.

According to the present invention, there is provided a system as set forth in the opening paragraph, characterised in that the user output device is operable to display messages in a plurality of fields, in that subdevices composing messages requiring two or more fields for display include one or more field separators in a transmitted message dividing the user readable message into separate portions, and in that the user output subdevice detects the or each field separator and displays the portions of the user-readable message in successive fields.

Suitably, the first message portion may include a code indicating the total length of the message. The originating subdevice may then transmit the message as a series of separate messages, and the user output subdevice may be configured to refuse to display messages received from other originating subdevices until all parts of the first message have been received. In this way, whilst the user output subdevice is effectively locked to the originating subdevice, there is no locking as such of the data path between them.

In order to cope with the possibility of an originating device going off-line during the course of transmitting a multiple-portion memory, the user output subdevice may be provided with means to 'time-out' a message whereby the user output subdevice would revert to accepting messages from any subdevice if there is a delay of greater than a predetermined period between successive message portions.

The invention further provides an originating subdevice having means for generating and inserting field separators in the manner hereinbefore described, together with a display device operable in the manner of the user output subdevice in the system hereinbefore described. Further aspects and features of the invention will become apparent from reading of the following description and claims.

Embodiments of the invention will now be described, by way of example, with reference to the accompanying drawings, in which.

Figure 1:
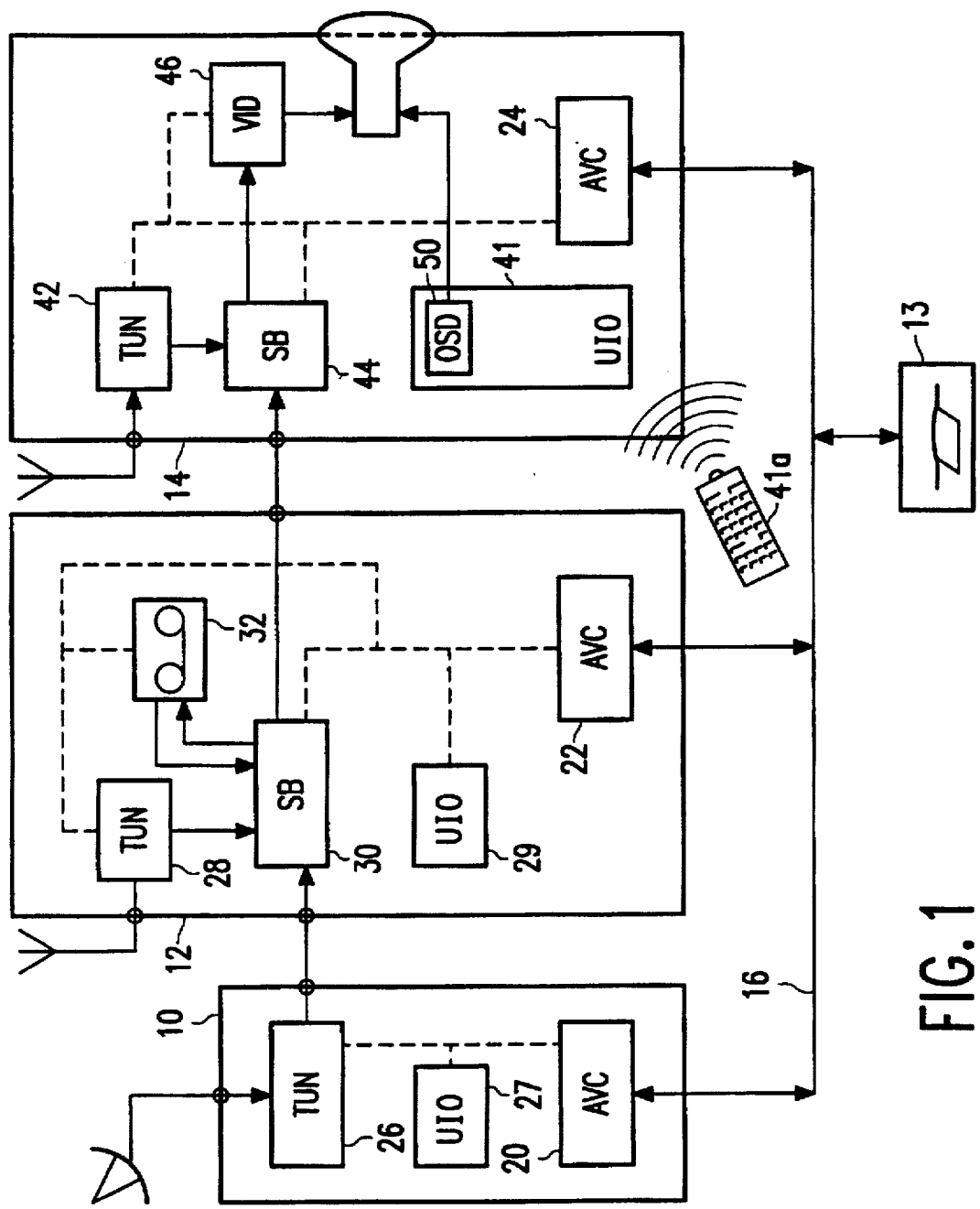
FIG. 1 shows a domestic audio/video system embodying the invention.

FIG. 1 shows a domestic video entertainment system comprising a satellite broadcast tuner 10, a video cassette recorder (VCR) 12 a smart card reader 13, and a television receiver 14, all connected to a serial data bus 16. Video and audio signals are passed within and between the devices 10, 12 and 14 using, for example, SCART (Euroconnector) plugs, sockets and multiwire cables.

The serial data bus provides for distributed control of the bus, and allows commands and other messages to be uniquely addressed for specific "devices", such as the apparatuses 10, 12, 13 and 14, and also for specific "subdevices" within each device.

Within each of the devices 10, 12 and 14 there are shown blocks representing subdevices. The division of a device into subdevices is necessary only in a logical sense, that is to say, from the point of view of its behaviour relative to the serial bus 16. In the physical implementation of the device, there may or may not be corresponding separate physical subdevices. In fact, in the embodiment shown, each device includes one audio/video controller (AVC) type of subdevice which provides the control and systematic interrogation intelligence for all subdevices within that device, relaying system messages to and from those subdevices as indicated by the dotted data paths in FIG. 1. The AVC subdevices also provide the (distributed) controlling logic of the system as a whole, interpreting user commands and controlling the operation of the system accordingly. Often, the control logic of the AVC and some or all of the other subdevices will be integrated using a single programmed microcontroller. Other subdevices not shown in FIG. 1 will generally be included in such a system, including timers, audio amplifiers, and so forth, and the subdevices described herein are presented as a representative sample only.

In the satellite tuner device 10, a tuner subdevice 26 (TUN) performs the signal processing functions necessary to provide baseband video signals to the connected devices. The AVC subdevice 20 receives user instructions from a user input/output (User I/O) subdevice 27 (UIO) (the front panel and/or remote control of the satellite tuner) and system messages from the bus 16, and operates to select channels, keep track of preset channel selections and so forth.

The VCR device 12 includes its AVC subdevice 22, and also a User I/O subdevice 29 (UIO), a terrestrial broadcast tuner subdevice 28 (TUN), a switchbox subdevice 30 (SB) and a videotape record/replay deck 32.

The television receiver device 14 includes its AVC subdevice 24 and also a user input/output subdevice 41 (UIO), a terrestrial tuner subdevice 42 (TUN), a switchbox subdevice 44 (SB) and a video monitor subdevice 46 (VID). The User I/0 subdevice 41 of the television receiver includes an on-screen display (OSD) function 50, as described hereinafter, and a remote control 41a for the receipt of user control signals.

In operation, the tuner subdevices 26,28 and 42 can be regarded as sources of video signals within the system. The video monitor subdevice 46 can act as a destination for video signals, and functions to display images to the user. The record/replay deck subdevice 32 can act as a source and/or a destination of video signals, depending on whether it is playing and/or recording at a given time.

Since the functional elements within the devices 10,12, 14 are addressable as system subdevices, any of the AVC subdevices 20,22,24 can take control of the bus and address commands to those subdevices. This is done for example by an AVC subdevice which has been informed of a user command by a User I/O subdevice and requires control of subdevices at various points in the system to implement the user's wishes.

System message formats for controlling the basic functions of certain common subdevices are defined, while scope is left for defining not only new commands, but also request and reply messages that enable one system device or subdevice to interrogate another as to its properties and status. Each switchbox subdevice 30 and 44 can be controlled via the bus (or by its associated AVC subdevice) to connect its output signal path(s) to a specified one of its input signal paths. For example, if a user indicates to the television receiver device 14 that it is desired to watch a certain satellite broadcast channel, suitably addressed and coded system messages can be sent via the bus 16 to ensure that the satellite tuner 10, VCR 12, card reader 13 and the television 14 are active, to cause the satellite tuner 10 to select the appropriate channel, to cause the VCR switchbox subdevice 30 and the television switchbox subdevice 44 to connect the appropriate signal path from source to destination. There are many ways of arranging these events with or without user intervention. For greatest user-friendliness, the whole process can be controlled by the AVC subdevice of the device which receives the user input. The information necessary for building the signal path from source to destination can be obtained by a suitable series of system request messages to the relevant devices and subdevices.

In order to provide a user-friendly user interface for the system, any AVC subdevice (hereinafter "AVC") may wish to display user messages using the on-screen display (OSD) facility 50 of the User I/O subdevice 41. For example, when the television is activated by a user and a signal path set up according to the user's wishes, the AVC 24 may wish to confirm visually for the user which channel is being watched.

Figure 2:
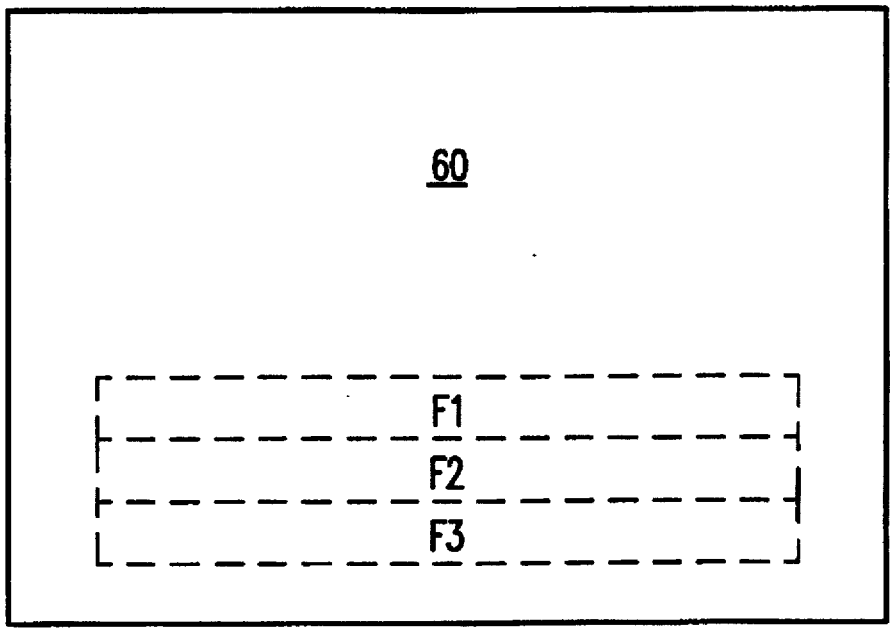
FIGS. 2 and 3 represent the position of message fields on a display.
Figure 3:
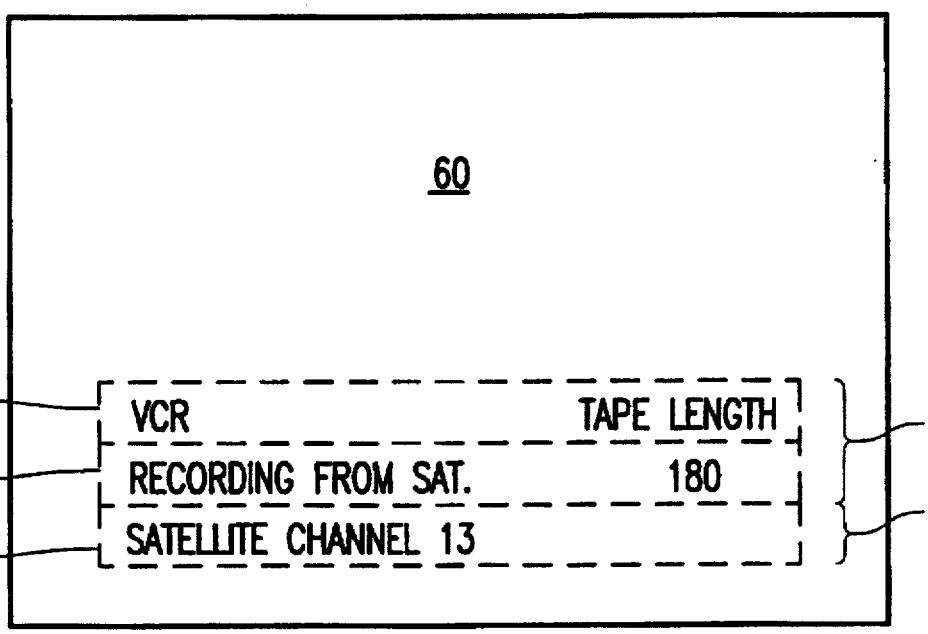

FIG. 2 shows a screen space 60 having three display fields F1, F2, F3 available: these are positioned near the bottom of the display to minimise the obscuring of television pictures. As shown in FIG. 3, a message M1 (in this case a status message from AVC 22 of the video recorder 12) may occupy more than one field F1,F2 as will be described hereinafter. As will also be described, if there are sufficient free fields, two or more messages may be displayed simultaneously, as shown by message M2 (from AVC 20 of satellite tuner 10) appearing in display field F3.

The control and operation of the OSD is determined by protocols for the dialogue language command, the OSD data and OSD status requests.

Figure 4:
FIGS. 4 to 8 illustrate on-screen-display control functions used in the system of FIG. 1.

The dialogue language command may be used to select the language and character set to be used by a device receiving the command for generating OSD messages and is in the format of an operating code (OPC) identifying a device language command followed by a first operand (OPR1) indicating the language and character set, as shown in FIG. 4.

Figure 5:

The response comprises a repeat of the dialogue language command followed by a response code (Resp) as shown in FIG. 5. The response code may take one of four values, namely "not implemented", "reject", "busy", or "completed".

The response code 'not implemented' indicates that the device does not support this command or the specified operands. Response code 'reject' indicates that, whilst the device is generally able to execute the received command, it is unable to do so on this occasion due either to the same or another device command/request being received or the current state of the device preventing execution (for example the device is inactive or is in an emergency state). Response code 'busy' indicates that the device has received and is processing the command but the final response (either 'reject' or 'completed') is at present unknown: the final response will be sent on completion of processing. Response code "completed" indicates that the command was executed as specified, that is to say the language and character set specified by the dialogue language command has been selected.

Figure 6:
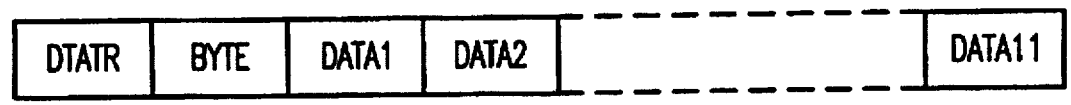

The OSD data protocol defines the format of the display data transmitted. Data is transmitted in frames, the general format of which is as shown in FIG. 6, with single frame messages or the first frame of a multiple frame sequence carrying additional information to further frames as described below. When data is transmitted in a multiple frame sequence, locking is used to maintain the path from originating to destination device (the user output subdevice). The first frame locks the destination and the final frame unlocks it: a maximum number of frames (4 is preferred) is specified for a locked sequence. When a message needs to be displayed in multiple lines on the television screen, each line is sent as a separate frame sequence. When Japanese data is being transmitted, where each character requires 2 bytes of definition, care must be taken not to split any 2 byte character code between successive frames.

Preferably a timeout provision is made for locking whereby, if no message portion (frame) is received by the user output subdevice for a predetermined period when locked, the lock is removed and messages from other subdevices may then be accepted.

As shown in FIG. 6, all frames are made up of 13 bytes. The first byte (DTATR) indicates whether the OSD is European/American (requiring 1 byte per character) or Japanese (two bytes per character), whilst the second (BYTE) indicates the number of DATA bytes following. The following DATA bytes (DATA1 to DATA11) specify the OSD data to be displayed, although in the first frame of a frame sequence only 8 character data bytes are available (DATA4 to DATA11), with the remaining bytes (DATA1 to DATA3) carrying control information relating respectively to the language and character set, the message mode, and the line sequence.

The byte for language and character set (DATA1) indicates the chosen character set and language, the code being as in the dialogue language command. The mode byte (DATA2) indicates the importance of the message as follows:

Normal: a normal message such as 'Play' sent from a VCR to indicate that a cassette is being played.

Important: an important message such as 'No Cassette' sent from a VCR when instructed to play or record and no cassette is present in the record/replay deck.

Alert: a warning message, such as 'Emergency'.

The line sequence byte (DATA3) provides one of two indications, depending on whether the frame is the first frame in the first line of a single or multiple line message, or whether the frame is the first frame in a subsequent line of a multiple line message. In the first line of a single or multiple line message, this byte indicates the total number of lines in the message, that is to say the number of frame sequences which will need to be received before the message is complete. In the first frame of a second or subsequent line of a multiple line message, the DATA3 byte may carry other data.

The OSD status request is sent from a device to a display subdevice to obtain information about the OSD function.

Figure 7:
Figure 8:
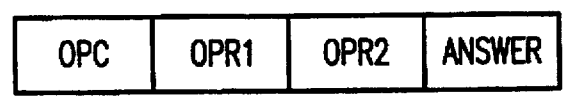

The request format is as shown in FIG. 7 with an operating code byte OPC indicating a video status request, followed by two operand bytes OPR1 and OPR2. The response format is as shown in FIG. 8. The response to the OSD status request includes an Answer byte indicating 'not implemented', 'reject' or 'completed'. An answer of 'not implemented' indicates that the display subdevice does not support the request or the option specified. An answer of 'reject' indicates that the display subdevice has the ability to execute the received request but is unable to do so on the present occasion due either to the same or another display subdevice command/request being received or the current state of the display device prevents execution (for example the display is inactive or is in an emergency state).

A 'completed' answer comprises a repeat of the video status request byte OPC, followed by the two operands OPR1 and OPR2 respectively representing language/character set and level, and an Answer byte indicating completion, that is to say the subdevice is currently in the state specified by the operands. The language/character set byte OPR1 indicates that the display subdevice will display OSD data in the language and character set specified. The level byte OPR2 indicates the OSD level supported by the display device as shown in Table I below:

TABLE 1

| Level | Display device |
| --- | --- |
| 1st | Displays modes (Normal, Important and Alert) in the same format. |
| 2nd | Supports separate formats for Normal and Important modes. Alert messages displayed in the same format as Important. |
| 3rd | Displays all modes in different formats. |

In order to simplify the operation of devices generating messages for display, the user output subdevice (the OSD function 50; FIG. 1) is given greater control of display than has heretofore been provided in, for example, the system of EP-A-0505006 (PHQ91010) referred to earlier.

All OSD messages are given a display lifetime (suitably of at least four seconds) by the OSD function which also handles the removal of messages at the end of their lifetime. This removes the responsibility from each subdevice sending a message to be displayed for timing the display and subsequently sending a further message to the OSD function requesting removal of the message. As will be appreciated, this also reduces the number of messages on the interconnecting bus system. Should an originating subdevice wish to maintain a message on screen for longer than its specified lifetime, it is required to reissue the display instructions within the original lifetime.

Figure 9:
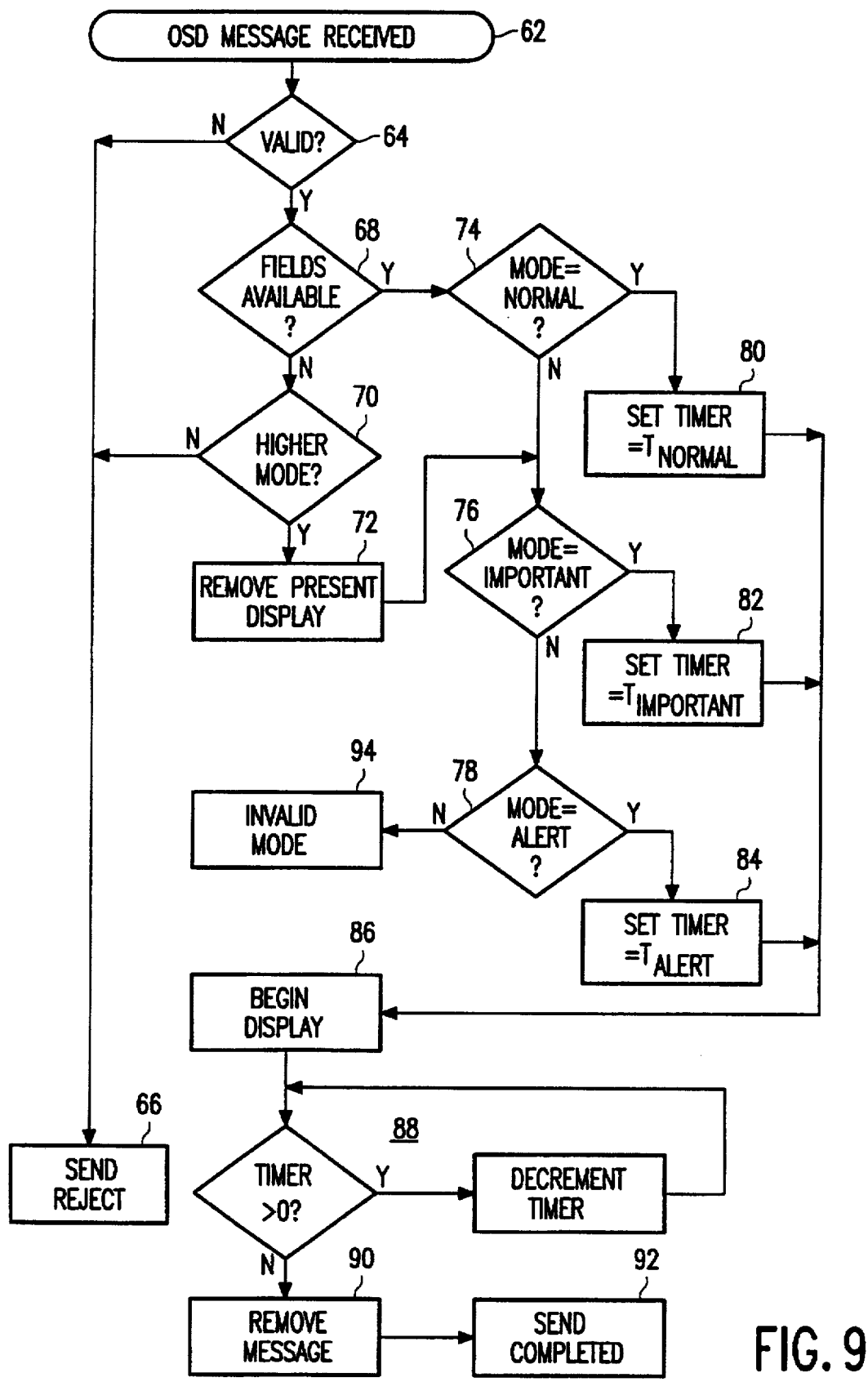
FIG. 9 is a flowchart illustrating OSD message control and timing.

FIG. 9 is a flowchart illustrating a number of the factors taken into account by the OSD function in the handling of OSD messages and commencing with the receipt of a message for display 62. A check (VALID?) 64 is made to ascertain whether message can be displayed (for example whether the display is inactive or in an emergency state) and, if not, a 'reject' message (SEND REJECT) 66 is sent as described previously.

If the message can be displayed, its length in terms of the number of fields required is determined and a check is made (FIELDS AVAILABLE?) 68 on the current display status to see whether there are sufficient presently unused display fields to accommodate the entire message. If an earlier received message is being displayed, such that there are insufficient free display fields to accommodate a later message, a comparison of the respective modes of the two messages (HIGHER MODE?) 70 is made to determine their relative "importance". If the earlier message has the same or a higher mode, the later message fails and the SEND REJECT stage 66 returns a 'reject' message to the originating subdevice of the later message. If however the later message has the higher mode, the earlier message is removed completely from display (REMOVE PRESENT DISPLAY) 72 thereby creating free display fields for the later message.

When there are free fields available (either originally or following removal of an earlier message) the mode of the message is determined as normal 74, important 76 or alert 78 and a message timer (not shown) is loaded with the appropriate message lifetime; $T_{NORMAL}$ (step 80), $T_{IMPORTANT}$ (step 82), or $T_{ALERT}$ (step 84).

Having set the timer, display of the message (BEGIN DISPLAY) 86 starts. A countdown loop 88, counts out the message lifetime and, on expiry, removes the message from display (step 90). Following removal, a "completed" message is sent (SEND COMPLETED) 92 to the originating subdevice as previously described.

As shown, a further check may be included at step 94 whereby messages with modes not satisfactorily identified as normal, important or alert are deemed invalid and a "not implemented" message is sent to the originating subdevice.

Setting of the display lifetime may be determined by the mode of the message, indicated by the originating device in the mode data bit DATA 2 in the message (FIG. 6) thereby setting the display duration for that message. Alternatively, to reduce complexity in the OSD function, the OSD function may assign a fixed lifetime to all received messages regardless of their mode or originating device. In such a case, steps 74–84 of FIG. 9 may be replaced by a single step of setting the timer to a countdown time standardised for all messages. In order to reduce conflicts, which may occur when a first message is being displayed and a second message is received by the display subdevice, the display subdevice manages the OSD messages in accordance with the following conditions:

the display subdevice treats each message as a single object, rather than as a set of separate lines to ensure that the display remains free from parts of previous messages and avoids the possibility of messages becoming mixed on screen;

accepts a command to display a message and determines whether display is possible depending on the size of the message and availability of display fields. An acknowledge message may then be transmitted to the originating subdevice indicating whether the message has been displayed;

a received OSD message will overwrite (that is to say completely replace) a previous message unless the display function determines that there are sufficient available display fields for the simultaneous display of both messages;

only one message at a time may be displayed per originating device or subdevice.

The above conditions, as implemented by the display subdevice, have advantages for the originating devices in that they are not required to search for free lines on the display, nor are they required to consider options supported by individual lines of the display, and they can send messages directly to the display subdevice without the prior step of issuing requests. An advantage to the user is that no partially overwritten messages can appear on the display.

From reading the present disclosure, other modifications will be apparent to persons skilled in the art. Such modifications may involve other features which are already known in the design, manufacture and use of local communication bus systems, domestic audio/video apparatuses and component parts thereof and which may be used instead of or in addition to features already described herein.

I claim:

1. A local communication system comprising a plurality of devices interconnected for the communication of messages via one or more data channels, each device including at least one functional subdevice element, the subdevices in the system including a user output subdevice for displaying user-readable messages to a user of the system, a user-readable message being determined by operating status of a device, composed into a user-readable message by the subdevice element of that device, and transmitted directly or indirectly to the user output subdevice for display, characterised in that the user output subdevice is operable to display messages in separate ones of a plurality of fields, in that subdevices composing messages requiring two or more fields for display include one or more field separators in transmitted message dividing the user-readable message into separate portions, and in that the user output subdevice detects the or each field separator and displays the portions of the user-readable message in successive fields.

2. A system according to claim 1, wherein the user output subdevice is operable to determine the length of a complete message and decide whether or not to display in dependence on whether or not there are sufficient fields to do so.

3. A system according to claim 2, wherein the originating subdevice includes, in the first frame of a message, a code indicating the length of the complete message which code is detected upon reception by the user output subdevice.

4. A system according to claim 3, wherein the user output subdevice is operable to determine from the length code the number of message portions comprising a complete message from a first subdevice and configured to refuse to accept messages from other subdevices until all of the said message portions have been received.

5. A system according to claim 4, wherein the user output subdevice reverts to displaying messages from other subdevices if no expected message portion is received during a predetermined period.

6. A system according to claim 1, wherein each user-readable message is assigned a display lifetime and, independently of the originating subdevice of a message, the user output subdevice times the message lifetime and removes the message from display on its expiry.

7. A system according to claim 2, wherein an originating subdevice assigns some of the hierachy of display mode values to a message and, on receipt by the user output subdevice, if there are insufficient free fields for display, the user output subdevice removes a currently displayed message to create free fields if the later received message has a higher mode value.

8. A display device for use in a system as claimed in claim 1, the display device having the technical features of the user output subdevice of the system.

9. A system subdevice for use in a system as claimed in claim 1, the subdevice having the technical features of a message originating subdevice of the system.

10. A system comprising
a plurality of devices; means for locally interconnecting the devices for communication of messages between the devices; and
a plurality of subdevices, each subdevice being disposed within a respective one of the plurality of devices, the subdevices including:
at least one originating subdevice for composing and transmitting a multifield message requiring two or more fields for display, the multifield message comprising one or more field separators separating the message into separate portions, the multifield message being determined by the operating status of that device which includes the originating subdevice, the portions being transmitted in user readable form;
at least one user output subdevice for
receiving the portions; and
video displaying the portions in separate ones of a plurality of successive message fields.

11. A display subdevice for display of messages in a device of a local communication bus system, the display subdevice including
means for receiving a user readable multifield message from an originating subdevice, which multifield message is divided into portions by at least one field separator, the multifield message being determined by the operating status of an originating device; and means for video displaying the multifield message in separate ones of a plurality of successive separate message fields.

12. An originating subdevice for creating messages in a device of a local communication bus system, the originating subdevice including
means for composing and transmitting a multifield message in a plurality of portions separated by at least one field separator, the multifield message being determined by the operating status of the device, the portions being transmitted in user readable form; and
means for communicating the multifield messages to a user output sub-device.

13. The system of claim 1 wherein the system is a D2B system.

14. The system of claim 10 wherein the system is a D2B system.

15. The subdevice of claim 11 wherein the system is a D2B system.

16. The subdevice of claim 12 wherein the system is a D2B system.

17. The system of claim 1 wherein "user readable" means that message data is transmitted in bytes symbolizing characters.

18. The system of claim 10 wherein "user readable" means that message data is transmitted in bytes symbolizing characters.

19. The subdevice of claim 11 wherein "user readable" means that message data is transmitted in bytes symbolizing characters.

20. The subdevice of claim 12 wherein "user readable" means that message data is transmitted in bytes symbolizing characters.

* * * * *